(12) United States Patent
Allison et al.

(10) Patent No.: US 7,580,323 B2
(45) Date of Patent: Aug. 25, 2009

(54) TUNABLE OPTICAL ASSEMBLY WITH VIBRATION DAMPENING

(75) Inventors: Sidney G. Allison, Williamsburg, VA (US); Qamar A. Shams, Yorktown, VA (US); Robert L. Fox, Hayes, VA (US); Christopher L. Fox, legal representative, Yorktown, VA (US); Melanie L. Fox Chattin, legal representative, Hayes, VA (US)

(73) Assignee: The United States of America as represented by the Administrator of the National Aeronautics and Space Adninistration, Washington, DC (US)

( * ) Notice: Subject to any disclaimer, the term of this patent is extended or adjusted under 35 U.S.C. 154(b) by 4 days.

(21) Appl. No.: 11/419,818

(22) Filed: May 23, 2006

(65) Prior Publication Data

US 2007/0091724 A1 Apr. 26, 2007

Related U.S. Application Data

(60) Provisional application No. 60/729,048, filed on Oct. 21, 2005.

(51) Int. Cl.
*G02B 6/00* (2006.01)
(52) U.S. Cl. .................................. 367/140; 250/227.14
(58) Field of Classification Search ................. 367/149; 356/32; 250/227.14–227.18; 385/12, 13
See application file for complete search history.

(56) References Cited

U.S. PATENT DOCUMENTS

| | | | |
|---|---|---|---|
| 4,922,096 A * | 5/1990 | Brennan .................... 244/3.16 |
| 4,985,624 A | 1/1991 | Spillman, Jr. | |
| 5,338,928 A * | 8/1994 | Jamieson et al. ....... 250/227.21 |
| 5,401,956 A | 3/1995 | Dunphy et al. | |
| 5,889,901 A | 3/1999 | Anderson et al. | |
| 5,991,483 A | 11/1999 | Engelberth | |
| 5,999,546 A | 12/1999 | Espindola et al. | |
| 6,018,160 A | 1/2000 | Bennion et al. | |
| 6,175,108 B1 | 1/2001 | Jones et al. | |
| 6,240,220 B1 | 5/2001 | Pan et al. | |
| 6,367,335 B1 | 4/2002 | Hicks et al. | |
| 6,580,855 B1 | 6/2003 | Vohra et al. | |
| 6,668,105 B2 | 12/2003 | Chen et al. | |
| 6,680,472 B1 | 1/2004 | Thigbo et al. | |
| 6,757,462 B2 | 6/2004 | Verdrager et al. | |
| 6,819,812 B2 | 11/2004 | Kochergin et al. | |
| 6,847,477 B2 | 1/2005 | Oron et al. | |
| 7,017,421 B2 * | 3/2006 | Kehlenbach .................. 73/800 |
| 7,030,366 B2 * | 4/2006 | Seeley et al. ........... 250/227.14 |
| 2002/0028034 A1 | 3/2002 | Chen et al. | |
| 2002/0154373 A1 | 10/2002 | Akashi | |
| 2003/0056351 A1 * | 3/2003 | Wilkie et al. ................ 29/25.35 |
| 2003/0168939 A1 | 9/2003 | Talebpour et al. | |

(Continued)

OTHER PUBLICATIONS

Allison et al.; Novel piezoelectric actuators for tuning an optical fiber Bragg grating; Opt. Eng., vol. 41, pp. 2448-2455 (2002).*

*Primary Examiner*—Dan Pihulic
(74) *Attorney, Agent, or Firm*—Robin W. Edwards

(57) ABSTRACT

An optical assembly is formed by one or more piezoelectric fiber composite actuators having one or more optical fibers coupled thereto. The optical fiber(s) experiences strain when actuation voltage is applied to the actuator(s). Light passing through the optical fiber(s) is wavelength tuned by adjusting the actuation voltage.

28 Claims, 3 Drawing Sheets

U.S. PATENT DOCUMENTS

2003/0219191 A1* 11/2003 Kehlenbach ................ 385/12
2004/0036005 A1   2/2004 Lim et al.
2005/0253050 A1* 11/2005 Seeley et al. ........... 250/227.14
2007/0091724 A1*  4/2007 Allison et al. ............... 367/149

* cited by examiner

TUNABLE OPTICAL ASSEMBLY WITH VIBRATION DAMPENING

Pursuant to 35 U.S.C. § 119, the benefit of priority from provisional application 60/729,048, with a filing date of Oct. 21, 2005, is claimed for this non-provisional application.

ORIGIN OF THE INVENTION

This invention was made by employees of the United States Government and may be manufactured and used by or for the Government of the United States of America for governmental purposes without the payment of any royalties thereon or therefor.

BACKGROUND OF THE INVENTION

1. Field of the Invention

This invention relates to optical fiber tuning. More specifically, the invention is an optical assembly that can be used to tune an optical fiber while also providing vibration dampening therefor.

2. Description of the Related Art

Strain tuning of optical fibers is known in the art and is currently accomplished in a variety of ways to include the use of piezoelectric and magnetic actuating elements. In terms of piezoelectric actuating elements, a stack of piezoelectric elements is typically required in order to provide the needed amount of mechanical movement because, in general, piezoelectric materials are not capable of producing large amounts of mechanical displacement upon actuation. Thus, the requirement that a stack of piezoelectric elements be used adds to the weight of an optical fiber tuning system. See, for example, U.S. Pat. No. 6,240,220. In terms of magnetic actuating elements, a multiplicity of magnets are used to stretch tune an optical fiber. See, for example, U.S. Pat. No. 5,999,546. However, the magnets are relatively heavy and bulky, and can be adversely affected by environmentally-present magnetic fields.

The stretch or compression (i.e., strain) tuning of an optical fiber is critical for a tunable fiber laser. In these types of lasers, an optical fiber having one or more Bragg gratings is strain tuned to provide a desired lasing wavelength. However, the Bragg gratings are sensitive to vibrations so that a tuning mechanism should also ideally provide vibration dampening for an optical fiber's Bragg gratings.

SUMMARY OF THE INVENTION

Accordingly, it is an object of the present invention to provide an optical assembly that can strain tune an optical fiber.

Another object of the present invention is to provide a lightweight optical assembly that can be used to strain tune an optical fiber.

Still another object of the present invention is to provide an optical assembly that can be used to strain tune an optical fiber and provide vibration dampening therefor.

Other objects and advantages of the present invention will become more obvious hereinafter in the specification and drawings.

In accordance with the present invention, an optical assembly has at least one piezoelectric fiber composite actuator adapted to have an actuation voltage applied thereto and has at least one optical fiber coupled to the actuator. The optical fiber experiences strain when the actuation voltage is applied to the actuator. A voltage source can be provided to apply the actuation voltage. Light passing through the optical fiber is wavelength tuned by adjusting the actuation voltage.

DETAILED DESCRIPTION OF THE INVENTION

Figure 1:
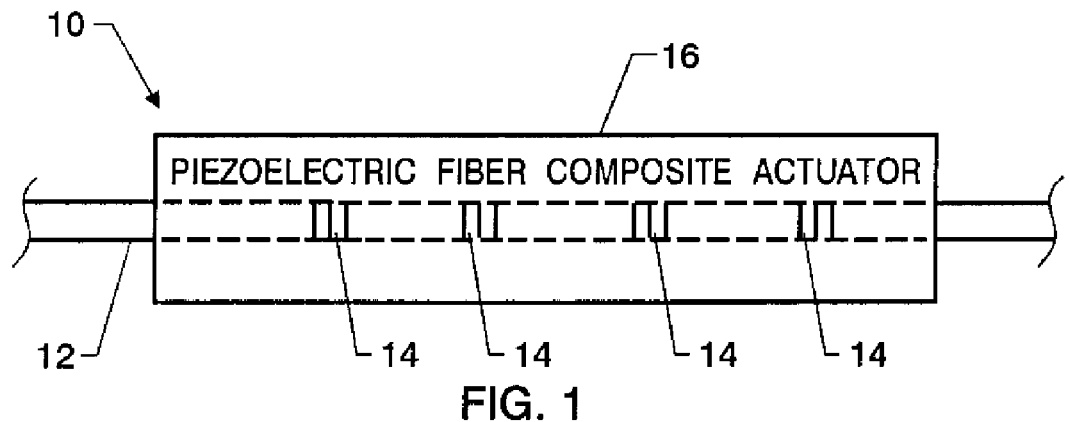
FIG. 1 is a schematic view of an optical assembly using one piezoelectric fiber composite actuator in accordance with an embodiment of the present invention.

Referring now to the drawings and more particularly to FIG. 1, an optical assembly that provides for the strain tuning of an optical fiber 12 is illustrated schematically and is referenced generally by numeral 10. Where incorporated into optical assembly 10, optical fiber 12 can include one or more Bragg gratings 14 as would be the case, for example, when optical assembly 10 forms a portion of a fiber laser as will be explained further below. In terms of optical assembly 10, optical fiber 12 is at least partially embedded in and coupled to a piezoelectric fiber composite actuator 16.

Actuator 16 is any conventional piezoelectric fiber composite actuator having the following structural features:

(i) a layer of individual piezoelectric fibers (e.g., round, square, etc.) arrayed side-by-side and typically encased in a polymer matrix material;

(ii) interdigitated electrodes etched or deposited onto one or two (e.g., usually two as will be described in the illustrated examples) polymer film layers with the resulting layers sandwiching the layer of piezoelectric fibers.

The layer of individual piezoelectric fibers can be assembled from individually-extruded piezoelectric fibers or can be formed from a macro sheet of polymer-backed piezoelectric material that has been processed (e.g., the piezoelectric material has been mechanically diced or etched, laser etched, etc.) to yield parallel rows of piezoelectric material "fibers" attached to the polymer backing. A piezoelectric fiber composite actuator constructed in this fashion is known as a macro-fiber composite actuator. A more complete description of such an actuator is disclosed in U.S. Pat. No. 6,629,341, the contents of which are hereby incorporated by reference.

Figure 2:
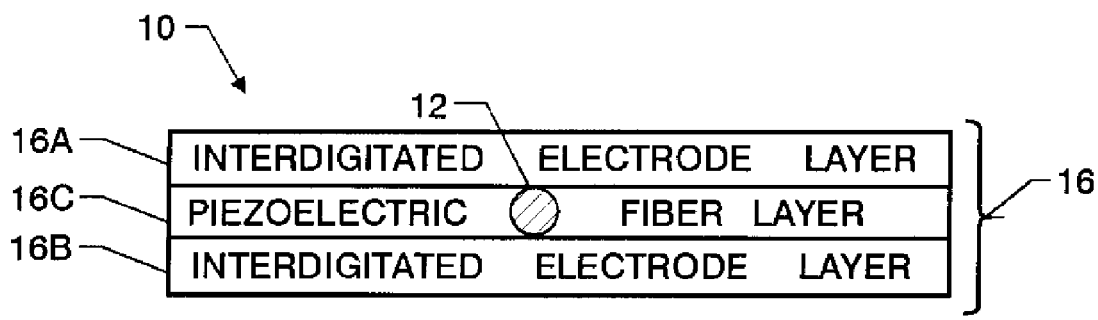
FIG. 2 is a schematic cross-sectional view of the optical assembly shown in FIG. 1.
Figure 3:
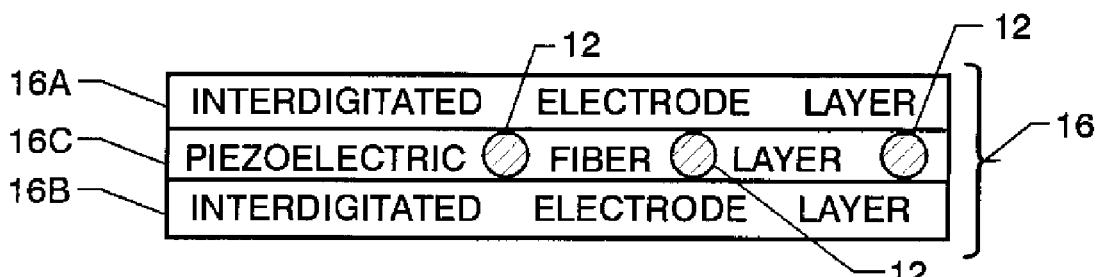
FIG. 3 is a schematic cross-sectional view of the optical assembly as it incorporates a plurality of optical fibers.

The above-described structure of optical assembly 10 is also illustrated in a schematic cross-section in FIG. 2 where interdigitated electrode layers 16A and 16B are sandwiched about and coupled to a piezoelectric fiber layer 16C with optical fiber 12 essentially replacing one of the piezoelectric fibers comprising layer 16C. It is to be understood that piezoelectric fiber layer 16C can be realized by either individually-extruded fibers or piezoelectric "fibers" formed from a macro-sheet of piezoelectric material as would be the case in a macro-fiber composite actuator. The present invention is further not limited to the use of a single optical fiber, as multiple optical fibers 12 could be embedded in piezoelectric fiber layer 16C as shown in FIG. 3.

In operation, an actuation voltage is applied to the interdigitated electrodes (not shown) in layers 16A and 16B. The applied voltage strains layer 16C which, in turn, strains layers 16A and 16B that are coupled to layer 16C. The applied voltage is controlled in order to control the strain in layer 16C and, therefore, the strain tuning of optical fiber 12 incorporated into layer 16C. That is, since optical fiber 12 is also coupled to layers 16A and 16B, optical fiber 12 will experience the strain along with the piezoelectric fibers comprising layer 16C. Further, since optical fiber 12 (and any Bragg gratings formed thereon) are embedded within actuator 16, the resulting optical assembly 10 is a construction that also provides vibration dampening for optical fiber 12.

Figure 4:
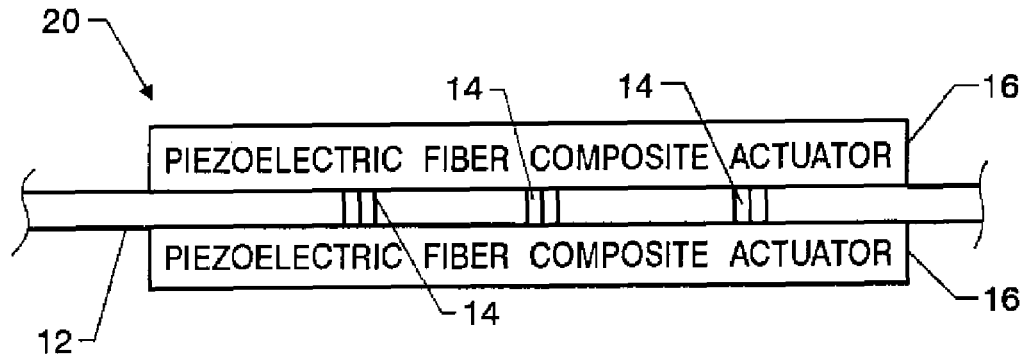
FIG. 4 is a schematic view of an optical assembly using two piezoelectric fiber composite actuators in accordance with another embodiment of the present invention.
Figure 5:
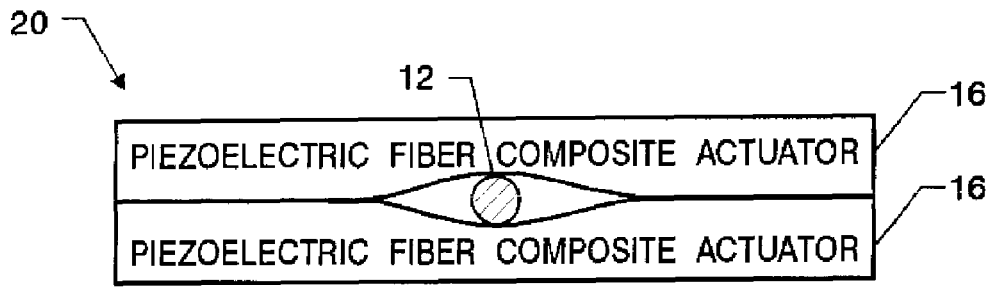
FIG. 5 is a schematic cross-sectional view of the optical assembly shown in FIG. 4.

Another embodiment of the present invention is illustrated in FIGS. 4 and 5 where an optical assembly 20 uses two piezoelectric fiber composite actuators 16. Each of actuators 16 can be constructed as detailed previously herein. That is, in optical assembly 20, each of actuators 16 is a finished or complete actuator with actuators 16 sandwiching/encasing a region of optical fiber 12 which, as in the previous embodiments, can include Bragg gratings 14. The structure of optical assembly 20 can be accomplished by applying an adhesive bond to the various elements and then curing the assembly in a vacuum bag in an autoclave oven. However, it is to be understood that other bonding techniques could also be used without departing from the scope of the present invention. Similar to the embodiment shown in FIG. 3, this two-actuator construction could also be adapted for use with a multiplicity of optical fibers.

Optical assembly 20 can be operated to apply strain evenly to optical fiber 12 when each actuator 16 imparts the same strain thereto. However, optical assembly 20 could also be operated to apply a differential strain to optical fiber 12 (i.e., to bend optical fiber 12) in accordance with different actuation voltages being applied to actuators 16. Thus, it is to he understood that the present invention is not limited by the various operational requirements that might be placed on optical assembly 20.

Figure 6:
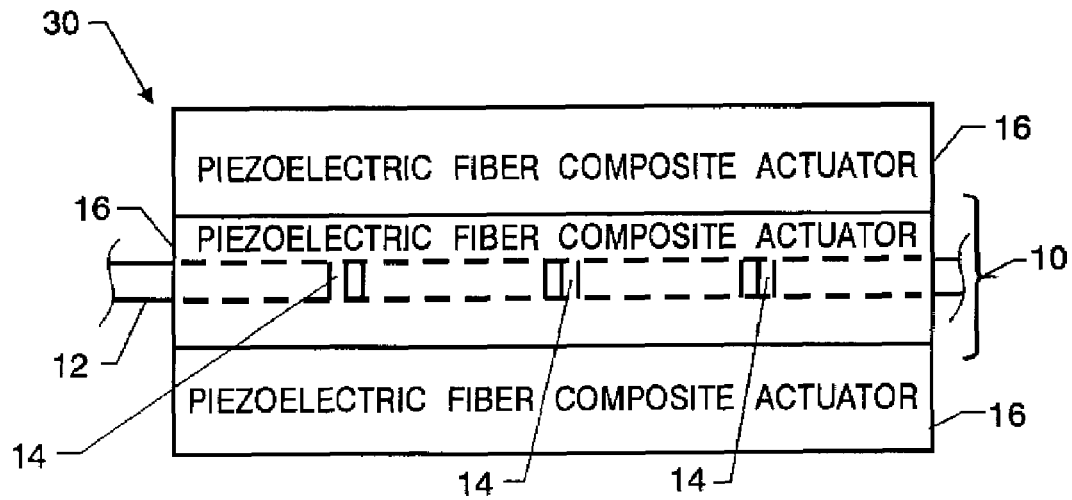
FIG. 6 is a schematic view of an optical assembly using three piezoelectric fiber composite actuators in accordance with another embodiment of the present invention.

Still another embodiment of the present invention is illustrated in FIG. 6 where an optical assembly 30 is essentially a combination of the optical assemblies presented in FIGS. 1 and 4. More specifically, optical assembly 10 is sandwiched between and is coupled to two finished or complete piezoelectric fiber composite actuators 16. Once again, while only one optical fiber 12 is illustrated, a multiplicity of optical fibers can be supported by optical assembly 10. The advantages of this construction are that more actuator force can be developed to strain the optical fiber(s), and that vibration dampening is enhanced.

Figure 7:
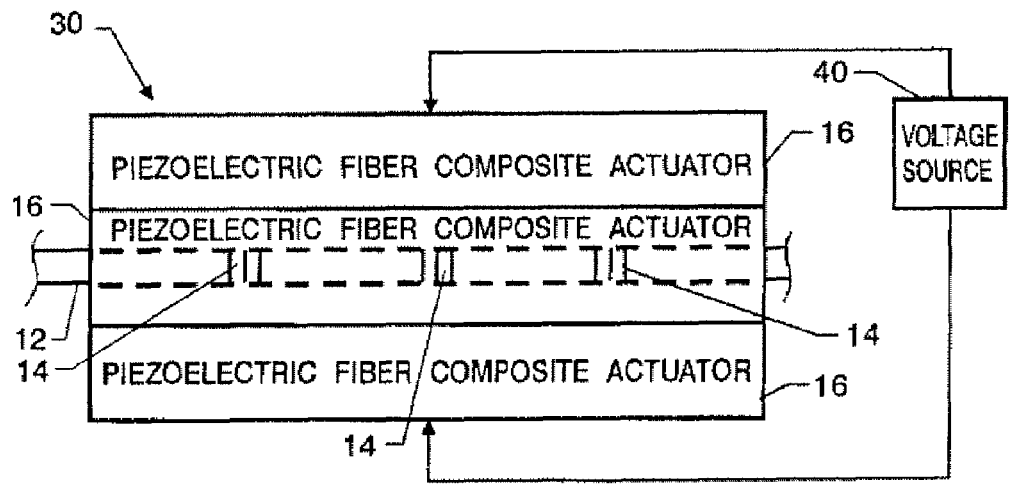
FIG. 7 is a schematic view of the optical assembly embodiment of FIG. 6 coupled to a voltage source for applying an actuation voltage to each of the assembly's actuators.

As mentioned above, the actuators used in the various embodiments of the present invention are adapted to have an actuation voltage applied thereto in order to generate strain in the actuator's piezoelectric fibers. Accordingly, each optical assembly of the present invention could include a voltage source. For example, optical assembly 30 (FIG. 6) is illustrated in FIG. 7 with a voltage source 40 coupled to each actuator 16. Voltage source 40 would typically be a controllable voltage source for applying the same or different actuation voltages to actuators 16.

Figure 8:
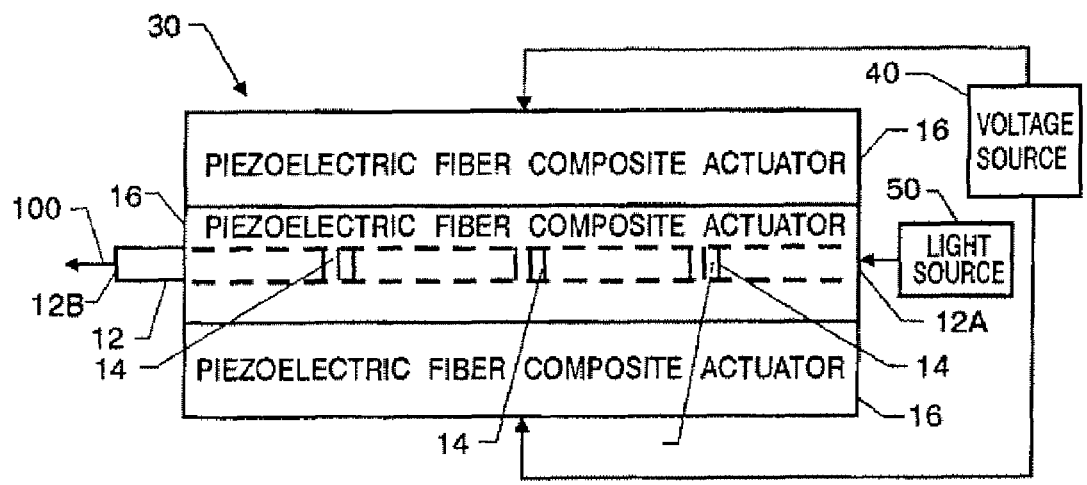
FIG. 8 is a schematic view of the optical assembly embodiment of FIG. 7 further having a light source coupled to one end of the optical fiber.

The present invention could also form part of an optical assembly that could be tuned to output different wavelengths of light (e.g., in the form of a laser beam). For example, the optical assembly in FIG. 8 includes optical assembly 30, voltage source 40, and a light source 50 (e.g., a laser pump) coupled to optical fiber 12 such that light generated by source 50 is coupled into one end 12A of optical fiber 12. Voltage source 40 applies an actuation voltage to each of actuators 16 in order to strain tune optical fiber 12 to control the wavelength of a light beam 100 exiting end 12B of optical fiber 12. It is to be understood that either of optical assemblies 10 or 20 could be used in place of optical assembly 30 in the embodiment shown in FIG. 8.

The advantages of the present invention are numerous. The optical assembly provides the means to strain tune an optical fiber while simultaneously providing vibration dampening for the assembly's optical fiber(s).

Although the invention has been described relative to a specific embodiment thereof, there are numerous variations and modifications that will be readily apparent to those skilled in the art in light of the above teachings. For example, the structure of the present invention could also be used in a sensing application to sense the strain produced by a piezoelectric fiber or macro-fiber composite actuator. Further, the tunable optical element need not be a Bragg grating as other tunable optical elements such as a Fabry-Perot optical sensor could be incorporated into the optical fiber(s). It is therefore to be understood that, within the scope of the appended claims, the invention may be practiced other than as specifically described.

What is claimed as new and desired to be secured by Letters Patent of the United States is:

1. An optical assembly, comprising:
    at least one piezoelectric fiber composite actuator adapted to have an actuation voltage applied thereto; and
    at least one optical fiber, having a first end and a second end, coupled to said actuator wherein said at least one optical fiber experiences strain when the actuation voltage is applied to said actuator;
    further wherein said at least one optical fiber is embedded in said at least one actuator.

2. An optical assembly as in claim 1 wherein said at least one piezoelectric fiber composite actuator is a piezoelectric macro-fiber composite actuator.

3. An optical assembly as in claim 1 wherein said at least one optical fiber includes at least one tunable optical element selected from the group consisting of a Bragg grating and a Fabry-Perot optical sensor.

4. An optical assembly as in claim 1 wherein said at least one optical fiber is partially embedded within said at least one actuator.

5. An optical assembly, comprising:
    first and second piezoelectric composite actuators adapted to have an actuation voltage applied thereto;
    at least one optical fiber, having a first end and a second end, coupled to said actuators wherein said at least one optical fiber experiences strain when the acuation voltage is applied to said actuators;
    wherein said at least one optical fiber is positioned between said actuators and bonded thereto along its length.

6. An optical assembly as in claim 1 wherein said optical assembly comprises one piezoelectric fiber composite actuator, and said optical assembly is further sandwiched between and coupled to second and third piezoelectric fiber composite actuators, each actuator adapted to have an actuation voltage applied thereto.

7. An optical assembly as in claim 1 wherein said at least one optical fiber is fully embedded within said actuator.

8. An optical assembly as in claim 1, further comprising a light source coupled to said first end of said at least one optical fiber.

9. An optical assembly as in claim 1, wherein the same activation voltage is applied to said actuators.

10. An optical assembly as in claim 1, wherein one or more different activation voltages are applied to said actuators.

11. An optical assembly as in claim 5, wherein said at least one piezoelectric fiber composite actuator is a piezoelectric macro-fiber composite (PMFC) actuator.

12. An optical assembly as in claim 5, wherein the same activation voltage is applied to said actuators.

13. An optical assembly as in claim 5, wherein one or more different activation voltages are applied to said actuators.

14. An optical assembly as in claim 5, wherein said at least one optical fiber includes at least one tunable optical element selected from the group consisting of a Bragg grating and a Fabry-Perot optical sensor.

15. An optical assembly as in claim 5, further comprising a light source coupled to said first end of said at least one optical fiber.

16. An optical assembly as in claim 6 wherein said first, second and third piezoelectric composite actuators are piezoelectric macro-fiber composite (PMFC) actuators.

17. An optical assembly as in claim 6, wherein the same activation voltage is applied to said actuators.

18. An optical assembly as in claim 6, wherein one or more different activation voltages are applied to said actuators.

19. An optical assembly as in claim 6, wherein said at least one optical fiber includes at least one tunable optical element selected from the group consisting of a Bragg grating and a Fabry-Perot optical sensor.

20. An optical assembly as in claim 6, further comprising a light source coupled to said first end of said at least one optical fiber.

21. An optical assembly, comprising:
at least one piezoelectric fiber composite actuator;
an optical fiber having a first end and a second end, said optical fiber having at least one tunable optical element formed in a region thereof that is coupled to said actuator, said at least one tunable optical element selected from the group consisting of a Bragg grating and a Fabry-Perot optical sensor;
a voltage source coupled to said actuator for applying an actuation voltage thereto; and
a light source coupled to said first end of said optical fiber;
wherein said at least one optical fiber is embedded in said at least one actuator.

22. An optical assembly as in claim 21 wherein said at least one piezoelectric fiber composite actuator is a piezoelectric macro-fiber composite actuator.

23. An optical assembly as in claim 21 wherein said optical fiber is partially embedded within said actuator.

24. An optical assembly as in claim 21 wherein said optical assembly comprises one piezoelectric fiber composite actuator, and said optical assembly is further sandwiched between and coupled to second and third piezoelectric fiber composite actuators, each actuator adapted to have an actuation voltage applied thereto.

25. An optical assembly as in claim 21 wherein said optical fiber is fully embedded within said actuator.

26. An optical assembly, comprising:
first and second piezoelectric composite actuators;
an optical fiber having a first end and a second end, said optical fiber having at least one tunable optical element formed in a region thereof that is coupled to said actuators, said at least one tunable optical element selected from the group consisting of a Bragg grating and a Fabry-Perot optical sensor;
one or more voltage sources coupled to said actuators for applying one or more actuation voltages thereto; and
a light source coupled to said first end of said optical fiber;
wherein said optical fiber is positioned between said actuators and bonded thereto along its length.

27. An optical assembly as in claim 26 wherein said piezoelectric fiber composite actuators are piezoelectric macro-fiber composite actuators.

28. An optical assembly as in claim 24 wherein said piezoelectric fiber composite actuators are piezoelectric macro-fiber composite actuators.

* * * * *